United States Patent [19]

Harvey et al.

[11] Patent Number: 4,973,442
[45] Date of Patent: Nov. 27, 1990

[54] FORMING BIAXIALLY ORIENTED ORDERED POLYMER FILMS

[75] Inventors: Andrew C. Harvey, Waltham; Richard W. Lusignea, Brighton; Dirk M. Baars, Brighton, all of Mass.; Donald Bretches, Waynesboro, Va; Robert B. Davis, Framingham, Mass.

[73] Assignee: Foster Miller Inc., Waltham, Mass.

[21] Appl. No.: 98,710

[22] Filed: Sep. 21, 1987

Related U.S. Application Data

[63] Continuation of Ser. No. 780,648, Sep. 26, 1985.

[51] Int. Cl.$^5$ .............................................. B29C 55/28
[52] U.S. Cl. ...................................... 264/503; 264/564; 264/102; 264/108; 264/204; 264/209.2; 264/233; 264/290.2; 264/312; 264/331.12; 425/326.1; 425/381; 425/382.3
[58] Field of Search ... 264/564, 310, 108, 210.2–210.8, 264/503, 233, 209.2, 290.2, 331.12, 203–204, 312, 102; 425/326.1, 382.3, 381

[56] References Cited

U.S. PATENT DOCUMENTS

| | | | |
|---|---|---|---|
| 4,011,128 | 3/1977 | Suzuki | 425/326.1 |
| 4,039,610 | 8/1977 | Johnson et al. | 264/209.5 |
| 4,085,175 | 4/1978 | Keuchel | 264/290.2 |
| 4,332,759 | 6/1982 | Ide | 264/108 |
| 4,358,330 | 11/1982 | Aronovici | 425/326.1 |
| 4,370,293 | 1/1983 | Peterson-Hoj | 264/567 |
| 4,377,546 | 3/1983 | Helminiak | 264/108 |
| 4,468,364 | 8/1984 | Ide | 264/211.12 |
| 4,487,735 | 12/1984 | Chenevey et al. | 264/331.12 |
| 4,536,365 | 8/1985 | Zwick | 264/290.2 |
| 4,554,119 | 11/1985 | Chenevey | 264/331.12 |
| 4,614,629 | 9/1986 | Economy et al. | 264/310 |

FOREIGN PATENT DOCUMENTS

| | | | |
|---|---|---|---|
| 51-16363 | 2/1976 | Japan | 264/559 |
| 56-2127 | 1/1981 | Japan | 264/176.1 |
| 60-58829 | 4/1985 | Japan | 264/176.1 |

*Primary Examiner*—Jeffery Thurlow
*Attorney, Agent, or Firm*—David G. Conlin; Ernest V. Linek; Linda M. Buckley

[57] ABSTRACT

This invention relates in general to the formation of thick films having a biaxial molecular orientation. Such films are prepared in accordance with the present invention from rod-like extended chain aromatic-heterocyclic ordered polymers. Such films have high tensile strength, modulus, and environmental resistance characteristics. A preferred ordered polymer for use in the present invention is poly (para—phenylenebenzo bisthiazole), (PBT), a compound having the structure:

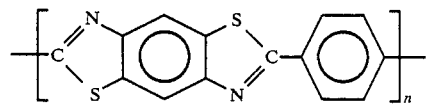

The present invention is also directed to methods and apparatus suitable for producing biaxially oriented films, coatings, and like materials from ordered polymers, preferably PBT.

31 Claims, 9 Drawing Sheets

FORMING BIAXIALLY ORIENTED ORDERED POLYMER FILMS

This is a continuation of co-pending application Ser. No. 780,648 filed on Sept. 26, 1985.

FIELD OF THE INVENTION

This invention relates in general to the formation of thick (i.e., greater than about 0.10, preferably 0.20 mm) films having a controlled biaxial molecular orientation. Such films are preferably prepared in accordance with the present invention from rod-like extended-chain aromatic-heterocyclic ordered polymers. Such films have a controllable coefficient of thermal expansion (CTE), low dielectric constant, low moisture pickup characteristics, low outgassing, high tensile strength, high modulus, and superior environmental resistance characteristics in comparison to uniaxial films of similar composition. The films of the present invention exhibit thermal stability, chemical resistance and toughness, even at low temperatures.

BACKGROUND OF THE INVENTION

Ordered polymers are polymers having an "ordered," orientation in space i.e., linear, circular, star shaped, or the like, imposed thereon by the nature of the monomer units making up the polymer. Most ordered polymers possess a linear "order" due to the linear nature of the monomeric repeating units comprising the polymeric chain. Linear ordered polymers are also known as "rod-like" polymers.

For example, U.S. Pat. No. 4,423,202 to Choe, discloses a process for the production of para-ordered, aromatic heterocyclic polymers having an average molecular weight in the range of from about 10,000 to 30,000.

U.S. Pat. No. 4,377,546 to Helminiak, discloses a process for the preparation of composite films prepared from para-ordered, rod-like, aromatic, heterocyclic polymers embedded in an amorphous heterocyclic system.

U.S. Pat. Nos. 4,323,493 and 4,321,357 to Keske et al., disclose melt prepared, ordered, linear, crystalline injection moldable polymers containing aliphatic, cycloaliphatic and araliphatic moieties.

U.S. Pat. No. 4,229,566 to Evers et al., describes para-ordered aromatic heterocyclic polymers characterized by the presence of diphenoxybenzene "swivel" sections in the polymer chain.

U.S. Pat. No. 4,207,407 to Helminiak et al., discloses composite films prepared from a para-ordered, rod-like aromatic heterocyclic polymer admixed with a flexible, coil-like amorphous heterocyclic polymer.

U.S. Pat. No. 4,108,835 to Arnold et al., describes para-ordered aromatic heterocyclic polymers containing pendant phenyl groups along the polymer chain backbone.

U.S. Pat. No. 4,051,108 to Helminiak et al., discloses a process for the preparation of films and coatings from para-ordered aromatic heterocyclic polymers.

Ordered polymer solutions in polyphosphoric acids (including PBT compositions) useful as a dope in the production of polymeric fibers and films are described in U.S. Pat. Nos. 4,533,692, 4,533,693 and 4,533,724 (to Wolfe et al.).

The disclosures of each of the above described patents are incorporated herein by reference.

Film processing methods and apparatus have been available for a number of years. For example, U.S. Pat. No. 4,370,293 to Petersen-Hoj describes a method and apparatus for the manufacture of biaxially oriented plastic films, particularly polyester films. The process described for polyester comprises extruding polyester through an annular die to form a seamless tube and inflating the tube by means of a pressurized gas. The expanded tube thus formed is drawn out in a longitudinal direction, cooled and flattened. The flattened tube is heated to the orientation temperature of the film, expanded again, and stretched in its longitudinal direction. These stretching techniques are said to impart a biaxial orientation to the polymeric backbone of the film.

Similarly, U.S. Pat. No. 4,011,128 to Suzuki describes a method and apparatus for forming a cross-oriented film, wherein a non-oriented film to be treated is first formed by conventional methods, then cross-oriented by stretching and twisting. In addition the cross-oriented film is flattened so as to continuously form a laminated cross-oriented film.

U.S. Pat. No. 4,358,330 to Aronovici describes a method and apparatus for manufacturing films having pairs of adjacent layers whose molecular orientation is in different directions. The method employed is a modification of the conventional "blown film" technique such that the molecular chains forming the layers of film are oriented substantially immediately prior to their solidifying.

U.S. Pat. No. 4,496,413 to Sharps, Jr., describes a process and apparatus for the preparation of a blocked cross-plied polymer film which involves the extrusion of a polymer melt through a tubular rotary die. The rotation of a single member of the die is said to impart a molecular orientation to the polymer in a transverse direction during the extrusion. The film is blocked by expanding the film and then pressing opposing walls together to produce a composite film having at least two layers, each having a transverse molecular orientation opposing the other. The composite film is said to have a balanced cross-ply.

The disclosures of each of the above described patents are incorporated herein by reference.

The degree of molecular orientation achieved during the rotating die extrusion of thermoplastic polymers is very low, since random coil thermoplastic melts are not oriented to any great extent by shear, unless the melts are anisotropic (such as Xydar). Minimal biaxial orientation of thermoplastics is obtained by blowing tubular films of the melt. Even then, the preferential molecular orientation in blown thermoplastic films is in the machine direction.

On the other hand, anisotropic dopes of ordered, rigid-rod polymers contain isolated bundles of oriented molecules suspended in solvent. It has been discovered that counter-rotating tubular extrusion of these polymers orients these crystallites in the direction of shear. Stretching of biaxially-oriented tubular films of anisotropic dope by blowing further increases the degree of orientation in such materials.

SUMMARY OF THE INVENTION

The present invention is directed to the production of films having heretofore unavailable strength characteristics in more than one direction. The starting materials useful herein include those lyotropic or thermotropic polymeric materials in which strain produces a material orientation in the microscale structure and which are relatively weak if this orientation is in only one direction, i.e., uniaxial. The present invention is particularly applicable to dopes and like materials made from ordered polymers, or other rigid rod-like molecules.

The method of the present invention comprises first producing a certain microscale structural orientation within a polymer dope by a sequence of straining methods, followed by solidifying this ordered structure by a sequence of thermal and/or chemical conditioning operations.

The present invention is especially directed to biaxially oriented films, coatings and like materials formed from ordered polymers. A preferred ordered polymer for use in the present invention is poly (paraphenylenebenzo bisthiazole), (PBT), a compound having the structure:

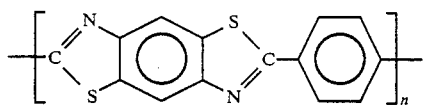

Biaxially oriented polymeric films of PBT are especially preferred embodiments of the present invention. These films possess unique properties including:

(a) high tensile strength (most preferably, greater than 100,000 psi ultimate tensile stress in one direction and not less than 40,000 psi ultimate tensile stress in any direction);

(b) high modulus (most preferably, greater than $5 \times 10^6$ psi tensile modulus in one direction and not less than $8 \times 10^5$ psi tensile modulus in any direction);

(c) controllable coefficient of thermal expansion (CTE) either negative, positive or zero in any particular direction in the plane of the film;

(d) low dielectric constant (most preferably, less than 3.0);

(e) low outgassing (most preferably, less than 0.1% weight loss in a vacuum at 125° C. for 24 hours;

(f) low moisture pickup (most preferably, less than 0.5% weight gain in water at 100° C. for 24 hours.

The present invention is also directed to methods and apparatus suitable for producing biaxially oriented films, coatings, and like materials from ordered polymers, preferably PBT.

The preferred films, methods and apparatus of the present invention are described in greater detail in the accompanying drawings and in the detailed description of the invention which follow.

BRIEF DESCRIPTION OF THE DRAWINGS

FIG. 9 illustrates various orientations of polymer films.

DETAILED DESCRIPTION OF THE PREFERRED EMBODIMENTS

The present invention is directed to the production of film having controlled anisotropic properties from ordered polymers.

When ordered polymers are subjected to a shear field they become highly aligned in the direction of the applied field. By imparting to such polymers a preferred orientation one obtains material with a high tensile value which is the basis for producing fibers of high strength.

Similar orientation imparted in the machine direction during the production of ordered polymer films results in films having a very high tensile strength in the machine oriented direction but very poor physical properties in the transverse direction. In some cases highly oriented polymer films will lose their film integrity by simply coming apart along the machine direction orientation.

The present invention is thus directed to the production of ordered polymer films that have highly controlled orientation resulting in films that have property balances that are much more useful from a practical standpoint. Films can be produced having high tensile values in the machine direction and substantial strength in the transverse direction. These films maintain their film integrity and as a result are useful in many applications requiring good film properties.

The process of the present invention affords films that have strength characteristics making them suitable for the production of laminate film composites and like structures.

The essential strength characteristics of these films are the result of a two stage orientation process followed by post treatment to optimize the film property balance. In preferred embodiments, the biaxial molecular orientation is achieved by utilizing a homogenized dope consisting of PBT in polyphosphoric acid. The term "polyphosphoric acid" as used herein, means any of the members of the continuous series of amorphous condensed phosphoric acid/water mixtures, generally given by the formula:

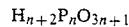

wherein the value of n depends upon the molar ratio of water to phosphorous pentoxide present. Such compositions are described in U.S. Pat. Nos. 4,533,692, 4,533,724, and 4,533,693 (to Wolfe et al.).

Figure 1:
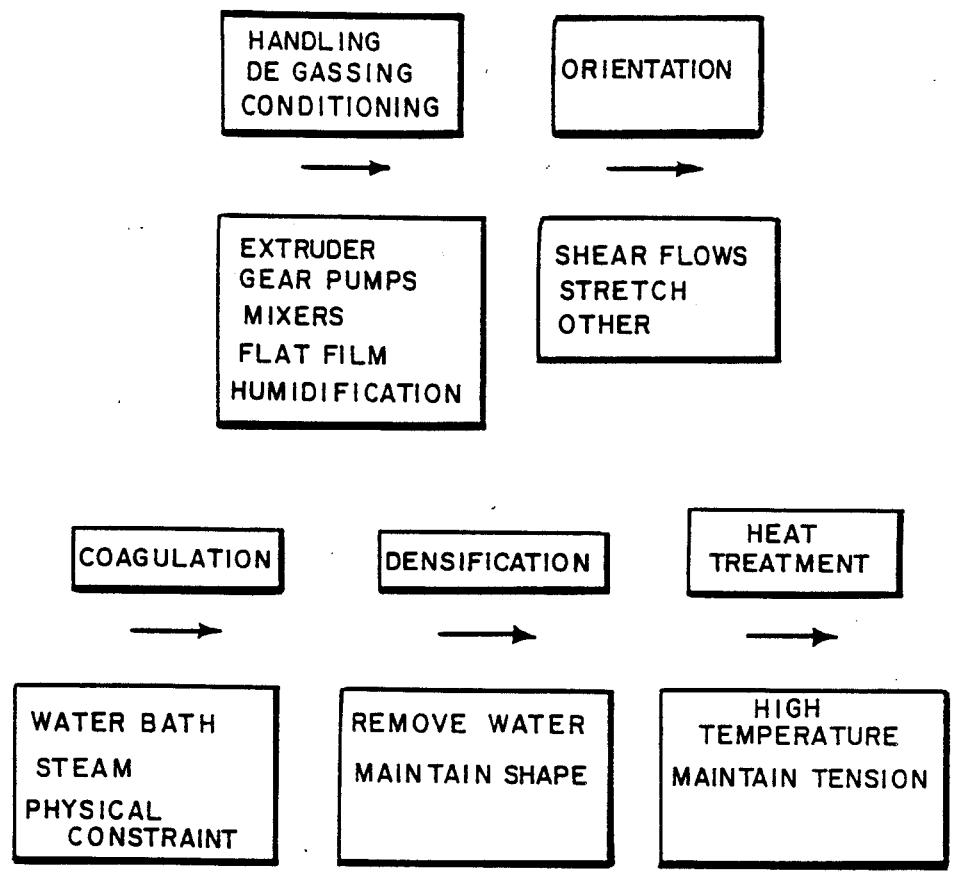
FIG. 1 is a block diagram depicting the process of the present invention for the formation of biaxially oriented films from ordered polymers.

Referring to FIG. 1, there is illustrated a block diagram of the principal steps of the method of the present invention for the formation of biaxially oriented films from the preferred ordered polymer, PBT.

As illustrated at 10 the first step comprises a conditioning of the polymer which preferably is about a 10 to 30 weight percent solution in poly(phosphoric acid), or PPA. PPA is the preferred solvent, although methanesulfonic acid (MSA) or chlorosulfonic acid (CSA) may also be used. The degassing step is employed to prevent interference of entrapped gas within the polymer solution with the molecular orientation of the film.

The second step (12) comprises the orientation step. This may be accomplished by the use of any of the extrusion means which induce shear flow, stretching, and the like. Preferred extrusion means of the present invention include counter rotating tube dies, plates, or roller dies. It has been discovered that such extrusion means, preferably combined with subsequent stretching of the extrudate, may be employed to impart varying degrees of biaxial orientation to ordered polymers.

A third step (14) comprises coagulation of the polymeric solution.

The fourth step (16) is a densification step wherein the PPA is removed.

The penultimate step (18) is generally a drying and heat treatment step.

Finally at step (20) the product film is packaged.

Each of these general steps will be elucidated further in the description of the preferred apparatus for conducting the above described processing conditions.

Figure 2:
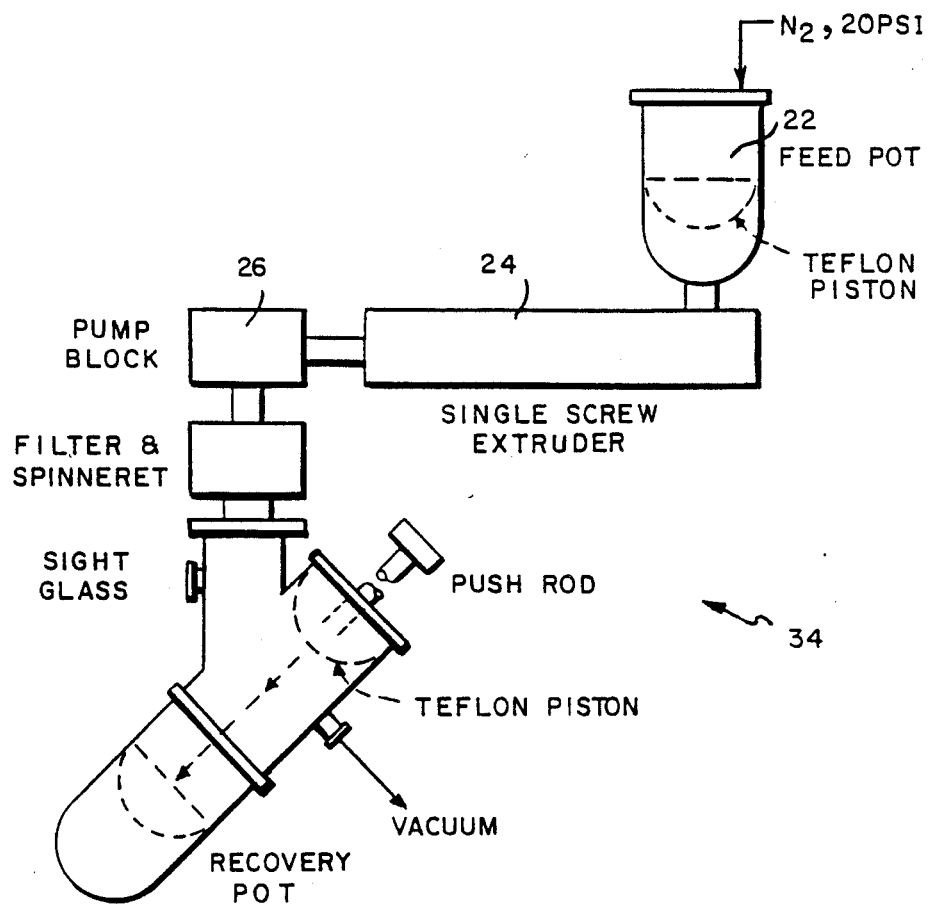
FIG. 2 is a schematic representation of a single screw extruder apparatus for the degassing and preconditioning of PBT dope.

In FIG. 2 there is illustrated one preferred embodiment of an extruder apparatus for the degassing of PBT dope. After homogenization (as described in the Wolfe et al. patents) the dope is fed by means of a heated pressure pot (22) to the inlet of a slow heated extruder (24) which in turn feeds a positive displacement pump (26).

Figure 3:
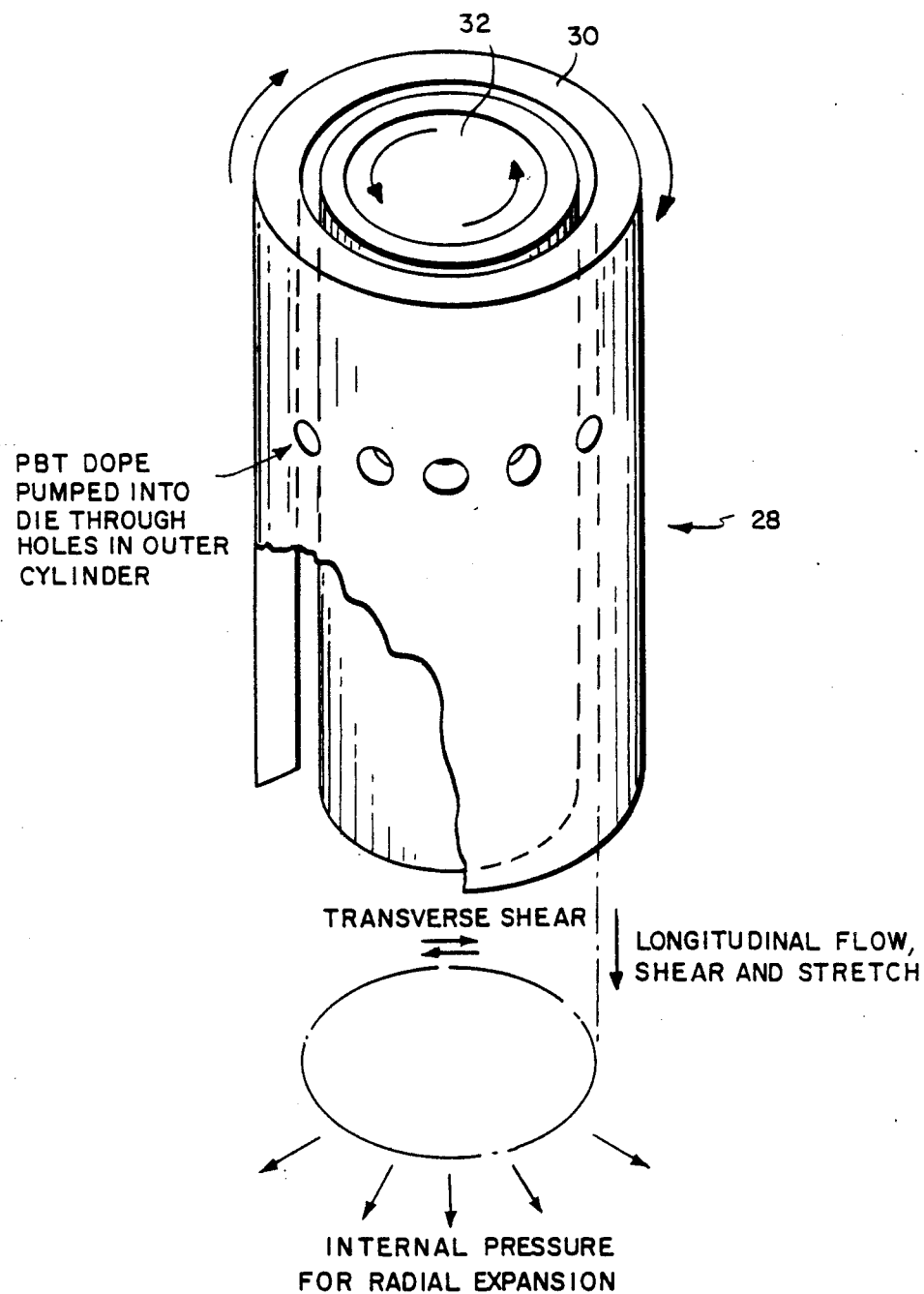
FIG. 3 is a schematic representation of a counter rotating tube die apparatus for producing a biaxially oriented film from an ordered polymer.

The positive displacement pump (26) of FIG. 2 feeds a film die (28) as illustrated in FIG. 3. The film die (28) has two counter rotating barrels, 30 and 32 respectively, whose purpose is to create a shear field through the cross section of the extruded dope composition. This shear field is at right angles to the axial shear field produced by forcing the dope axially through the annulus of the die. Counter rotating die members are necessary to prevent a screw-like rotation of the orientation and twist-off of the extrudate which occurs if only one member of the die is rotated. This combination of shear fields is necessary prior to the blowing operation in order to permit blowing of the tube without fracturing the extrudate, and hence, to produce material with integral biaxial film properties.

Upon exit from counter rotating die (28) the film is treated to a blowing operation. Here, the film is expanded under internal pressure, further orienting the molecules throughout the film cross section. Control of the die RPM, extrusion rate, film windup rate, and degree of expansion results in a precisely aligned, blown PBT dope composition film. The top and bottom surfaces of the film are aligned at approximately equal but opposite angles to the machine direction.

As described above, the processing variables of die speed (RPM), extrusion rate, and degree of film extension and expansion during the blowing operation, all can be varied to achieve any desired degree of biaxial molecular orientation.

Control of the degree of molecular orientation results in attractive film properties. Blown dope compositions that have not been subjected to controlled shear fields prior to expansion do not have physical property balances anywhere approaching those of the films of the present invention. Furthermore, films extruded by the counter rotated die but not with the blowing process do not have good property balances. It is the combination of shear field extrusion followed by internal expansion and extension that yields films with a useful property balance.

The extruded, sheared and blown film is quenched, both on the internal and external surfaces, by an aqueous coagulation bath or other controlled aqueous coagulant composition. This quenching operation serves to "gel" the polymer dope composition, producing a strong, tough, solution-filled film. By controlling the composition of the coagulation bath many other materials can be incorporated into the film microstructure.

In addition to causing the film microstructure to gel and become strong, the aqueous solution serves to hydrolize the polyphosphoric acid to phosphoric acid, facilitating its removal from the film. The solution-filled film is then washed free of phosphoric acid before it is subjected to controlled drying conditions.

Figure 4:
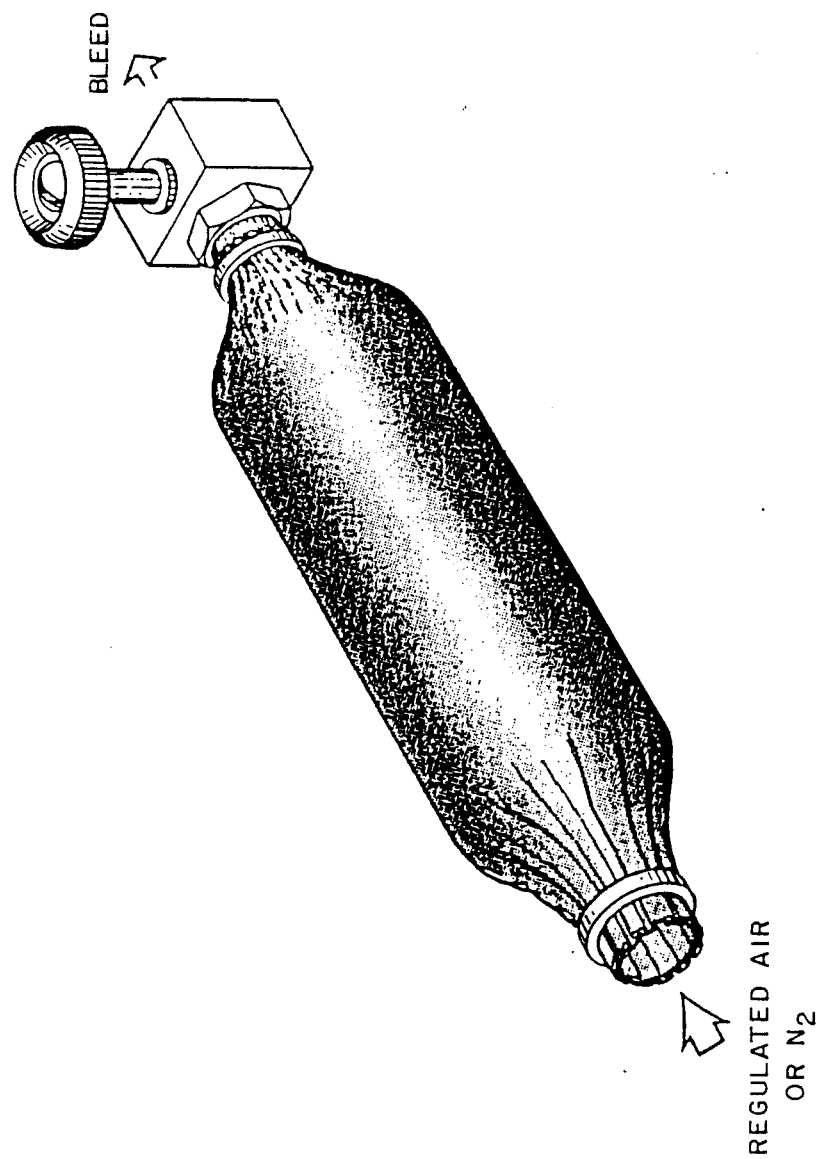
FIG. 4 is a schematic representation of one preferred drying/heat treating apparatus used for producing a biaxially oriented film from an ordered polymer.

As illustrated in FIG. 4, the film is preferably dried under controlled internal pressure, also known as a restrained drying process. This is accomplished by drying the film under a regulated air or nitrogen pressure of from about 5 to 10 psi as illustrated. The pressurized film tube in the example may have about 1.5 to 3 inches diameter and a length of from about 5 to 12 inches. Drying under such conditions results in a highly oriented film of high strength characteristics.

Figure 5:
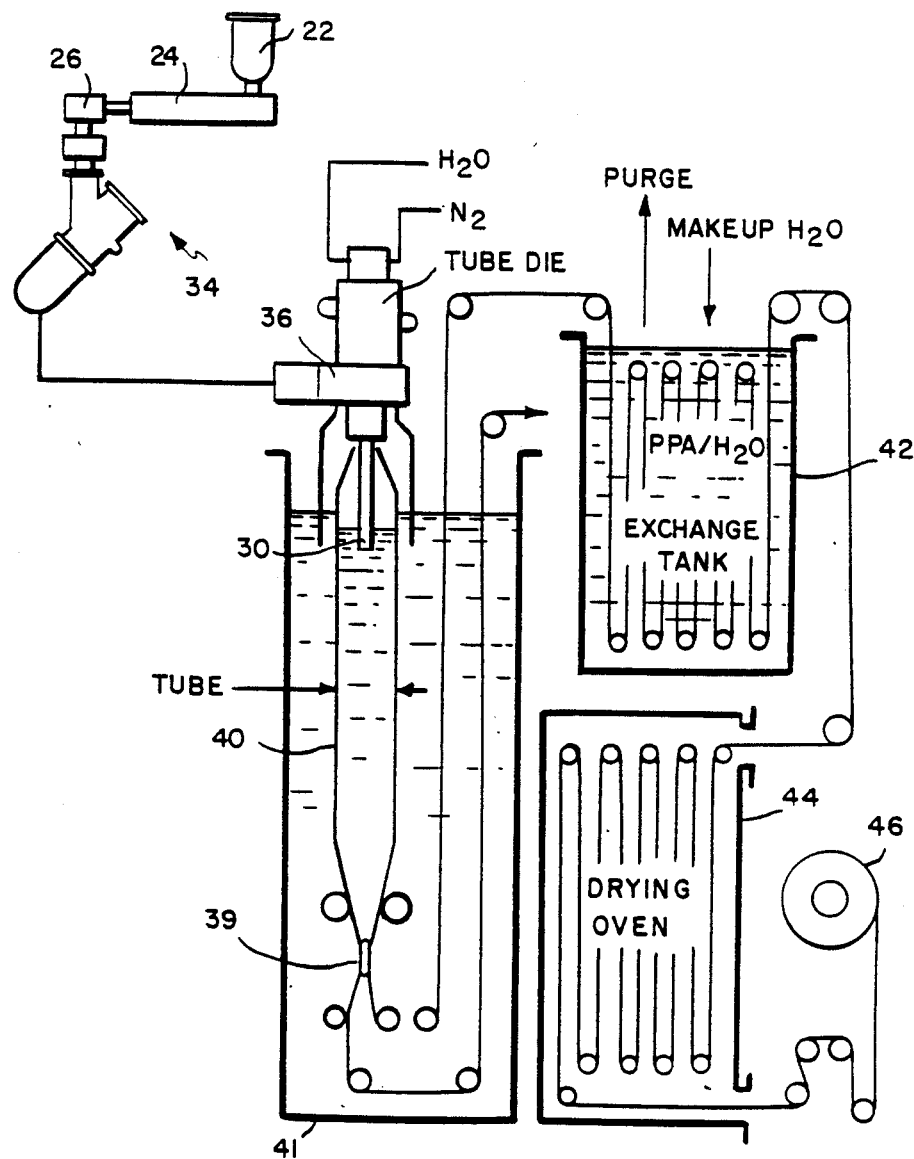
FIG. 5 is a schematic representation of an apparatus incorporating the die of FIG. 3 constructed in accord with the present invention.

FIG. 5 illustrates schematically the above described processing steps. As illustrated, the conditioning and degassing step is conducted by the apparatus (34), which sends the homogenized dope to the extruder means (36) whereupon shear is imparted to the dope. The dope is then blown using conventional film blowing equipment (38) and the blown tube enters coagulation zone (40). The coagulation zone (40) comprises a water tank (41) and may include additives useful in imparting specialized characteristics to the film. The coagulation zone acts to stabilize the molecular orientation imparted to the film by the extrusion and blowing processes. The water and/or additives in the bath spread into the microstructure of the film. Following the coagulation zone, there is shown an exchange bath (42). Here the acid solvent used to prepare the polymer dope (PPA, MSA, CSA, etc.) is removed by repeated water washings. Following removal of the acid solvent from the film, the film can be exposed to other solutions that may include additives useful in imparting special characteristics to the film. Afterward, the film is dried under appropriate stress conditions in a drying oven (44). After drying, the film is packaged using conventional means (46).

When tube-blowing is employed, if the tube is not slit after coagulation but is merely collapsed flat for water-solution and drying treatments, it can then be re-blown and stretched biaxially in a tower- or tunnel-oven. The tube is slit into tape and roll-packaged just downstream of a central plug mandrel and guide rolls. Tube-blowing gas is advantageously introduced through the mandrel.

Figure 6:
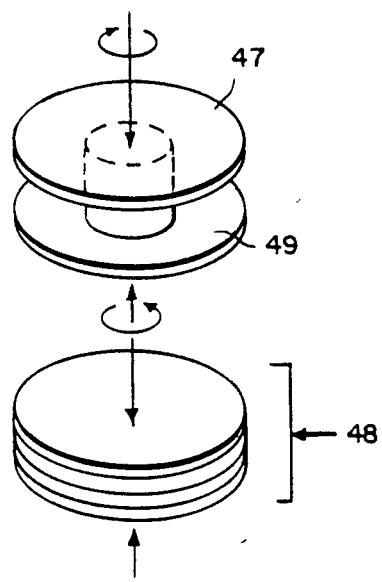
FIG. 6 is a schematic representation of a counter rotating plate apparatus for producing a biaxially oriented film from an ordered polymer.

FIG. 6 illustrates another means of imparting shear stress to the polymer dope that is useful in the method of the present invention. As illustrated, the stress means

(48) comprises counterrotating pressure plates (47 and 49). Polymer dope, such as PBT is inserted between the plates, pressure is applied and the plates are rotated in opposite directions.

Figure 7:
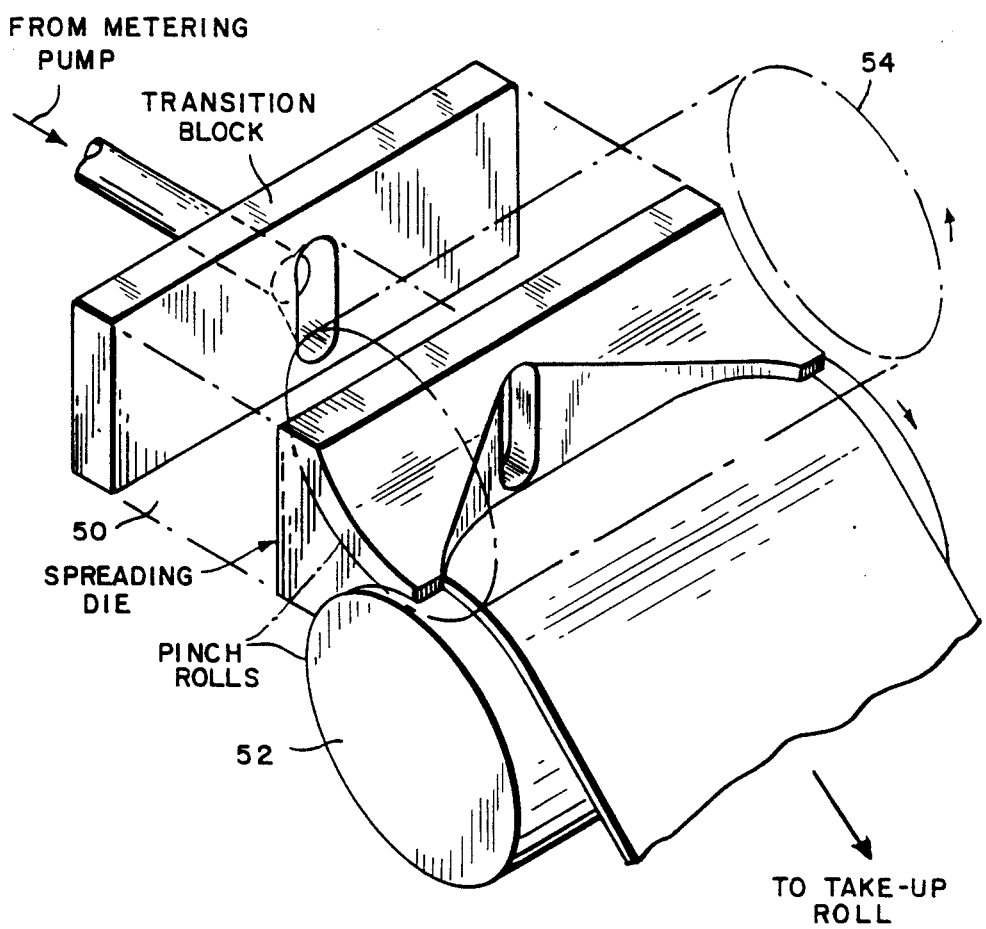
FIG. 7 is a schematic representation of a roller die apparatus for producing a biaxially oriented film from an ordered polymer.

Another means for imparting shear stress to a polymer dope in accord with the method of the present invention is the apparatus illustrated in FIG. 7. As illustrated, a laterally spreading die (50) having open top and bottom is contoured to fit in the convergence of two pinch rolls (52 and 54). The extrudate enters the die as a high and narrow flow, then undergoes progressive lateral and axial direct strains to emerge as a thin and wide strip. This strip then undergoes some further axial extension to become a film on one of the rolls, depending on the balance between roll surface velocity and supply pressure induced flow. Process variables include the proportions and internal shape of the die, the supply pressure, and the film tension.

Figure 8:
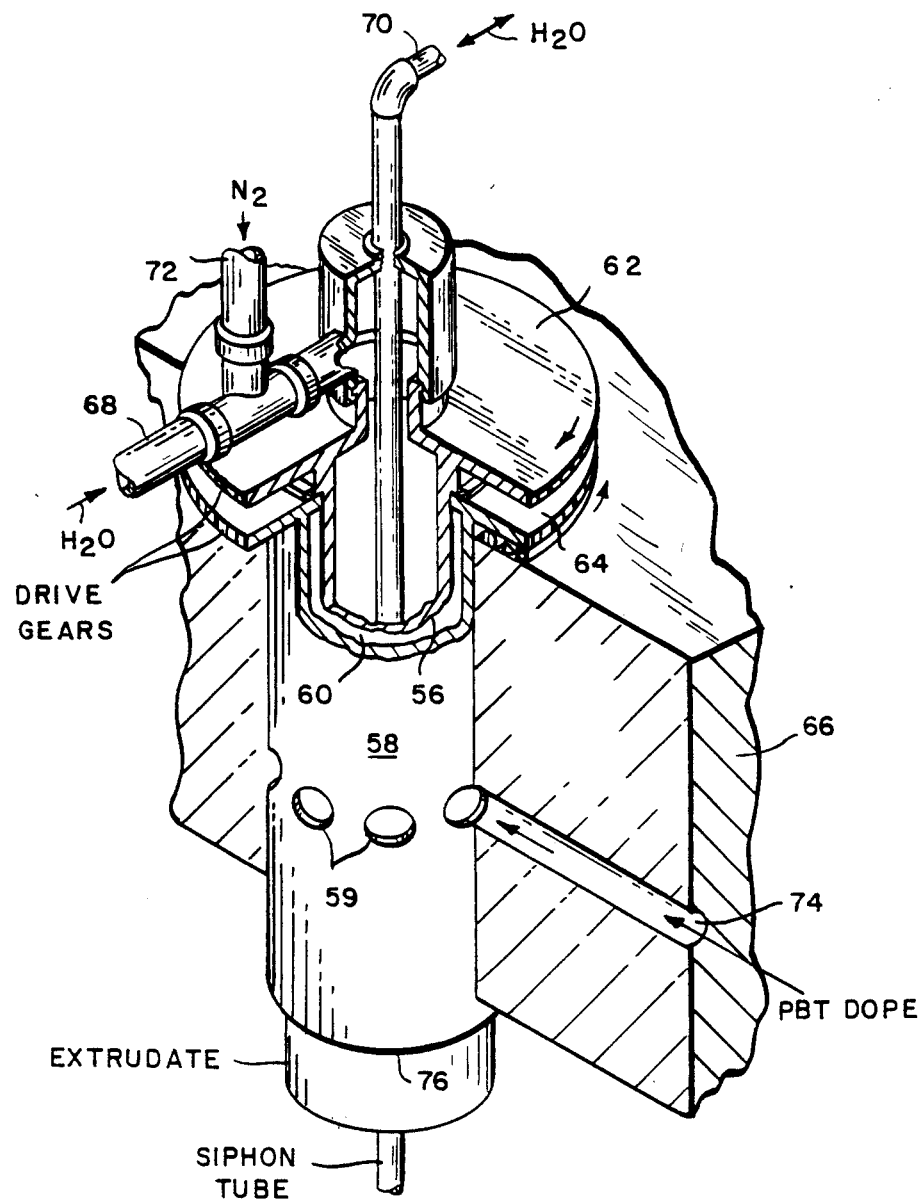
FIG. 8 is a schematic representation of the processing apparatus preferably employed in the present invention.

The apparatus illustrated in FIG. 8 represents a counter-rotating tube die which comprises a rotatable cylindrical inner shaft (56) having a smooth surface encased in an independently rotatable cylinder (58) having a plurality of passageways therein (59). A space (60) is provided between the shaft and the cylinder to allow for the introduction of polymer and to allow independent movement of shaft (56) and cylinder (58). Cylinder (58) and shaft (56) are rotated in opposite directions. Ordered polymer is fed through passageways (59) to the space (60) between shaft (56) and cylinder (58). The polymeric mass strikes shaft (56) and is subjected to orientation forces by the opposing movement of cylinder (58) and shaft (56). Drive gears (62) and (64) are shown, attached to outer cylinder (58) and inner shaft (56) respectively. Also illustrated is housing (66) which surrounds the tube die and serves to control the temperature of the extrusion system. Water inlet (68) and outlet (70) are provided to maintain the composition of the coagulation zone and to exert pressure on the interior of the blown film tube. Nitrogen inlet (72) serves to maintain an inert atmosphere within the die and also provides the means for blowing (i.e., expanding) the film into a tube upon its exiting the die. Drive gears (62) and (64) are operated by independent variable speed drive means such as electric motors (not shown).

Ordered polymer is pumped through passageway (74) in housing (66) whereupon it impinges upon the surface of rotating cylinder (58). The polymer flows through the plurality of passages (59) in cylinder (58) into the space (60) between cylinder (58) and rotating shaft (56). Since the top of the die is sealed, the polymer flows to the outlet at the bottom (76). As the polymer flows toward the outlet (76) counteracting shear forces imparted by revolving cylinder (58) and revolving shaft (56) impart a degree of biaxial orientation to the film's molecular structure.

Previous attempts to rotate only one cylinder of the tube die while maintaining the other in a stationary condition caused uncontrolled twisting and tearing of the dope extruding from the die.

Transverse shear, longitudinal flow shear, axial stretch, and radial expansion forces all interact in the dies illustrated in FIGS. 3, 6, 7 and 8 to impart a partial biaxial orientation to the ordered polymer fed therethrough. Variation of the speed of the movement of the shaft and cylinder of the illustrated die, as well as flow rate, temperature, etc. effect the degree of orientation imparted to the ordered polymer feedstock. Additional orientation is imparted to the extruded film by virtue of the blowing processes, both following the extrusion and as a part of the heat treatment.

Figure 9A:
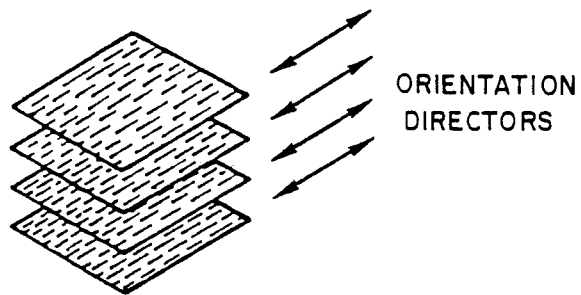
FIG. 9A represents uniaxial orientation, i.e., that imposed on polymers by typical slit-die extrusion or fiber spinning.
Figure 9B:
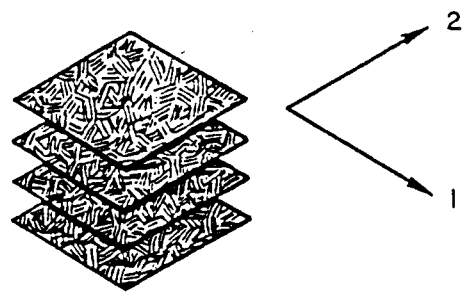
FIG. 9B represents the random disorder of ordered polymer films that are coagulated without pre-orientation.
Figure 9C:
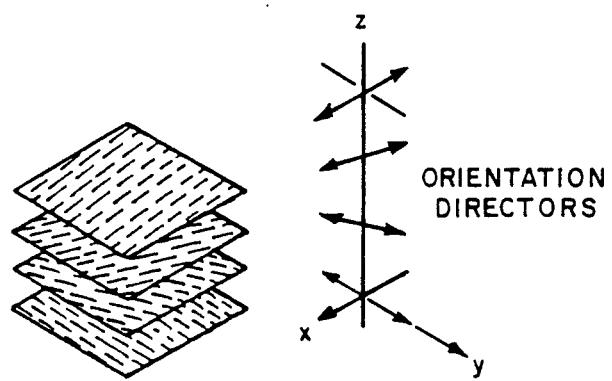
FIG. 9C illustrates the biaxial order imposed on the polymer of FIG. 9B by treatment in accord with the present invention.

FIG. 9 illustrates the various orientations imparted to polymers by stress conditions. Typically, polymers subjected to shear stress assume a uniaxial orientation as illustrated in FIG. 9A. Ordered polymers in solution have the scattered or random nematic orientation illustrated in FIG. 9B. FIG. 9C illustrates the twisted nematic (or cholesteric) orientation imparted to ordered polymers by processing under the method of the present invention.

In the preparation of twisted nematic orientation with PBT by solution processing, molecules in adjacent planes with twisted orientation are not able to pack closely on solvent removal. Thus, each "layer" will have to densify by diffusion transverse to the rod axis, an unlikely process on the microscopic scale of the sheet. Consequently, if twisted nematic orientation is smooth and gradual through the film thickness, the densification can occur with the least amount of strain or disruption between adjacent layers.

Biaxial shearing as well as biaxial direct stresses and strains can be imposed and controlled in this system. A useful combination of strain patterns is achieved by the apparatus of FIG. 8 where first a twisted nematic (cholesteric) orientation is promoted in the dies and then a uniform biaxial strain is promoted in the blow/stretch. The former provides enough bi-directional strength for the latter, as well as near-order of layers, conducive to densification in the normal (thickness) direction. The biaxial strain can be symmetric or asymmetric. If this system is operated with low strain in the dies, then biaxial blow/stretch will promote biaxial nematic orientation rather than twisted nematic.

Of course, the system of the present invention could be used to produce uniaxial nematic tube or film as well.

A common characteristic of laminates of the preferred biaxial film materials is that they can be weak in the transverse direction (i.e., perpendicular to the plane of the laminated film). It is therefore desirable to increase the so called trans-laminar strength of biaxial films by using additional processing steps in the manufacture of the films. These additional steps can be during the preparation of the dope or in the washing or solution processing of the coagulated film. Trans-laminar strength of the film can be increased either by increasing the cohesivity between the ordered, rigid-rod polymer structure, and/or by enclosing the ordered structure in a binding, surrounding network of the added material. This added material typical does not interfere with the rest of the processing steps, because the added material is not rendered strong and cohesive except by a subsequent processing step, e.g., heat treating or chemical conversion.

An important aspect of the methods envisioned for increasing trans-laminar film strength is that the added material is not necessarily intended to be a major fraction of the final structural material or film; the added material can be a very minor constituent of the final structure and still provide substantial trans-laminar cohesivity or strength. In fact, since the rigid-rod ordered polymeric structure is relatively very competent, the added material most preferably is a very minor component, such that the final overall material has the highest specific strength and stiffness properties, i.e., highest strength and stiffness per weight and volume.

One method of increasing the trans-laminar strength of biaxial PBT film is to blend a finely divided powder of compatible material with the PBT dope during the dope-preparation step of the total process. A preferred material is polyphenylene sulfide (PPS), at about 10 percent by volume (or more) of the final dope. PPS is a strong, highly resistant, thermotropic polymer. This powder remains in the dope and the prepared film through all of the processing steps up to the final drying stage. During drying and heat treating, the film is heated to a temperature that melts the PPS, causing it to flow around and between the PBT rod-like microscale structure. Subsequent pressing or rolling and cooling produces a structure that is strong in all directions of stress.

Another method of increasing translaminar strength is to diffuse a precursor of a strong binder material into the PBT film during the washing stage of the process. This precursor can be an organometallic precursor of an inorganic glass, such as tetramethoxysilane; or an organically-modified glass precursor that has reactive organic groups incorporated therein, such as expoxides; or a precursor of a thermotropic plastic, such as caprolactam as a precursor for nylon, or polyamic acid as a precursor for polyimide. After the precursor has diffused into the washed but still swollen PBT film, e.g., various sequential solvent exchanges, the film is dried and heat treated, causing a transformation of the added material to its final form as a strong trans-laminar binder material. As a final binder material, glasses and polyimides are preferred over nylons, because the former materials more nearly complement the high temperature and strength properties of the PBT film structure.

The processing equipment of the present invention is straightforward in design and fabrication, with the exception of the counter-rotating die assembly. The storage tank must be heated, is preferably made of stainless steel (e.g., type 316L suitable for PPA processes), and is pressurized with dry/inert gas (e.g., $N_2$) in order to prevent both coagulation of PBT and/or starvation of the pump. The pump is typically a precision-gear type (e.g., Zenith). Other types of pump, such as piston-ram, extruder, or traveling-cavity (Moyno), are possible.

While other counter-rotating tube-dies exist, the design of the die of the present invention is specialized in that a wide range of parameters can be explored by using different speeds and die-inserts. Sealing between the hot block and die cylinders is affected by spring loaded face-bushing (Teflon ® or graphite), and alignment is maintained by remote collar bearings. Because the extrudate undergoes so much densification to final thickness, the die annulus is usually large, moderating die pressure required. The central gas for film blowing ($N_2$) is provided through a remote, cooler, standard rotating coupling.

Function and operation of the extrusion-blowing system are thus straightforward:

Counter-rotation of the dies generates transverse shear without any net twist or torque on the extruded tube.

The pump generates the axial flow and, in combination with the annular gap, determines the axial shear (flow profile).

Draw-down of the tube at a linear rate greater than die-discharge causes an axial strain in the hot, uncoagulated extrudate.

Blowing of the film tube causes circumferential stress and strain in the extrudate.

Immersion in a water bath after blow/stretch causes coagulation and, below the central water level, a balance of pressure and nulling of pressure differential, unless the tube is pinched closed at the bottom.

Key processing parameters for successful extrusion of biaxial film from PBT/PPA dope with a tube die substantially as depicted in FIG. 8 are listed in Table I. This tube die has adaptors at the exit of the die to allow for two different annular diameters and gap distances. Referring to FIG. 8, the shear zone length is the distance between the inlet passageways (59) and the exit of the tube die (76). Shear rates are calculated as the linear velocity difference between the revolving cylinders divided by the gap distance. Blow ratio is defined as the final diameter of the coagulated PBT/PPA tube divided by the initial diameter of the PBT/PPA tube at the exit of the die. The draw ratio is defined as the linear bulk velocity of the PBT/PPA extrudate, at the exit of the die, divided by the wind-up roller linear velocity, referring to (Part 46) of FIG. 5. The linear bulk velocity is defined as the volumetric output of the extruder dived by the cross-sectional area of the annular gap of the die. For typical PBT/PPA dope, the extruder zone temperature was 120° C. and the die zone temperature was 80° C.; i.e., the PBT/PPA dope was cooler in the die than the extruder.

TABLE I

| Tube Die Specifications: | |
|---|---|
| Annular Gap | 0.040", 0.080" |
| Annulus Diameter | 0.80", 1.5" |
| Shear Zone Axial Length | 4 inches |
| Processing Conditions: | |
| Shear rate | $1s^{-1}$ to greater than $3s^{-1}$ |
| Blow ratio | 1:1 to 3:1 |
| Draw ratio | 8:1 to 20:1 |
| Extruder Temperature | 120° C. |
| Die Temperature | 80° C. |

Applications of the high-strength, high-modulus, thermally-stable, chemically resistant, microporous PBT polymer films of the present invention include the following: (1) multi-layered, structural composites molded to complex shapes, (2) rigid, glass-containing composites, (3) filters of controlled porosity for use in harsh environments; (4) gas separation membranes; (5) water-purification membranes; (6) electronic circuit board structures; (7) lightweight space structures; (8) multi-layered, electrically conducting structural composites; (9) ionizing radiation-resistant composites; (10) low radar profile structures; (11) zero coefficient of expansion structural composites; (12) porous substrates for controlled release of volatile materials in harsh environments; (13) leaf springs, helical springs and (14) capacitors.

The method of the present invention will be further illustrated with reference to the following examples which are intended to aid in the understanding of the present invention, but which are not to be construed as a limitation thereof. All percentages reported herein, unless otherwise specified, are percent by weight. All temperatures are expressed in degrees Celsius and are uncorrected.

EXAMPLE 1

The coagulation and take-up system substantially as described in FIG. 5 was used, and blown tube films were extruded under the following conditions:

| | |
|---|---|
| extrusion die: | 3.81 cm diam. × 1.02 mm gap |
| extrusion rate: | 3 cc/min |
| air gap: | 11.7 cm |
| coagulation zone: | 18.8 cm |
| take-up speed*: | 24.6. cm/min. |
| counter-rotating shear rate: | 4 sec$^{-1}$ |
| blow-up ratio: | 1.5:1 |
| draw ratio: | 10:1 |

*speed with empty package roll

The PBT/PPA dope of this example had an intrinsic viscosity (IV) of 19 as measured by the method described in the Wolfe et al. patents (supra).

Figure 10:
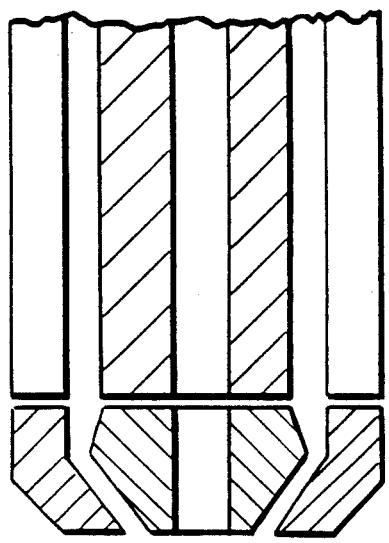
FIG. 10 illustrates an end-attachment for the tube-die of FIG. 8 to reduce the die gap thereof.

An attachment was made for the tube die to reduce the extruded tube diameter to 2 cm (see FIG. 10). This allows greater blow-up ratios using the same take-up system, which is limited to a 7.6 cm maximum bubble diameter. The die gap was 1.02 mm and the counter rotating shear rate was about 4.5 sec$^{-1}$.

The die was also operated at the full 2.04 mm gap, without any end fixtures, to determine whether the variation in extruded wall thickness was due to the inner and outer mandrels of the die, or to the attachments. These films, which are twice as thick (approximately 0.003 in, 0.076 mm), are fairly uniform in thickness once the system reaches steady-state, and they do not exhibit any spiral pattern.

Uniform operation can be restored by a combination of reducing internal pressure, increasing longitudinal draw, decreasing internal water height, and spraying thin sections with water to "freeze" that section of the bubble. Other blown tube processes (high molecular weight polyethylene, for example) encounter similar bubble stability and film thickness problems. Internal mandrels (within the bubble) can be used to direct cold air at the blown film to chill it (analogous to coagulation). Driven pinch rolls could also be used to provide more controllable draw.

Converging plates were used on one run to collapse the bubble and reduce folding and creasing of the tube. The plates were made from clear acrylic sheets and were attached about 2 cm above the pinch so that the tops of the plates were above the water level and the PBT film would be coagulated before touching the inclined plate. In operation, the coagulated PBT tube tended to stick then slip on the plates, causing some vibration in the take-up system. This was the result of unexpected friction between the tube and the plates, and could be remedied by using Teflon plates, or going to a roller or belt converging system. Otherwise, the converging plates worked well to maintain bubble diameter and alignment, and resulted in smooth surface films.

Washing and Drying Films

All film samples were collected on a wide spool under water and were kept under water without air contact and interleaving corsely woven material was used to allow water circulation. Samples were washed for at least 48 hours before drying. The samples measured 0.8% phosphorous after 24 wash, and 4% on samples with only 5 minutes wash.

Several drying methods were attempted including:
Clamping wet films in 7.6 cm square frames
applying internal pressure of 5 to 9 psi to the wet tube
using rods inside the tube with variable
spring-load between the rods.

The clamped frame method works well, is simple and is convenient to hold samples for subsequent heat treatment trials. The internal gas pressure methods requires a pressure regulator, crimping seal at two ends of the tube and a pressure relief valve to allow passage of gas and water from the inside of the tube. Internal pressure causes thin film sections to be more highly stressed than thick ones, but the stress is more predictable than in the case of the clamping frame. Stress was calculated during drying trials at 3000 to 5000 psi in the hoop direction, and half that in the longitudinal direction.

EXAMPLE 2

The PBT/PPA dope of this example was obtained from DuPont, and identified as follows:
SRI code 5103-28
50 KG (110 lb) of PBT/PPA
13.7% PBT
Intrinsic viscosity (IV)=40, as measured by SRI
DuPont has measured 35 to 40, indicating variability in the dope. The viscosity is stable with temperature, they report).
82.7% p$_2$O$_5$ These material are much more viscous than the 19 IV dope used in Example 1.

The dope preparation system was assembled as in Example 1, with vacuum degassing, a 50-hole (0.36 mm diameter) spinneret, and a sintered metal filter (80 micron) spin pack. The major difference between this and Example 1 (using 19 IV polymer) was than the feed pot piston pressure and temperature were increased. The 40 IV dope required 100 psi instead of 20 psi, and 240° F. instead of 200° F. The flow from the feed pot to the extruder was slower because there was almost no shear on the dope and the viscosity remained quite high. Once in the barrel of the extruder, the screw provided shear, and the 40 IV material extruded easily at about 230° F. and 1000 psi barrel pressure—very similar to conditions with the 19 IV polymer. The extruder was operated at 3 cm/min; faster rates may require more temperature and pressure at the feed pot to avoid starving the extruder.

Degassing proceeds in much the same way as the 19 IV dope. The filaments falling into the vacuum showed "graininess" indicating entrained gases were being removed. About 2.5 L (5 kg or 11 lb) of PBT/PPA dope was prepared by one pass through the system.

As described in Example 1, the tube die was modified to reduce bearing clearances, improve alignment, and reduce corrosion problems.

About 50 ft of high quality film was produced from this example. Relatively high draw ratios were used, in the range of 13:1 to 21:1 because bubble stability improved markedly when take-up was increased. Blow-up ratios were maintained at about 2:1. All successful film trials were made with the 0.040 in. gap. These conditions resulted in relatively thin film, 0.1 to 0.6 mil (2.5 to 15.2 micron) in thickness. These thin films could be produced consistently at steady-state because of the "toughness" of the 40 IV polymer dope and the improved precision of the die.

The die rotation rate was varied from 0.5 to 2 rpm with a die temperature of 190° F.

The most successful extrusion conditions are summarized below:

| | |
|---|---|
| throughput: | 3 cc/min |
| barrell pressure: | 1000 psi |
| die pressure: | 50 to 75 psi (estimated) |

-continued

| | |
|---|---|
| barrel temperature: | 230° F. |
| die temperature: | 190° F. |
| draw ratio: | 13:1 to 21:1 |
| blow-up ration: | 2:1 |
| die rotation: | 0.5 rpm |

An ice-water coagulation bath was used to achieve better film properties. The low temperature bath provided a slower coagulation which was less disruptive to the oriented PBT polymer network.

Film Property Measurements

Tensile tests showed improved strength and modulus for biaxially oriented films. Heat treatment was conducted at 400° C. for 2 hours. Higher temperature heat treatment will be evaluated at temperatures up to 650° C. for brief periods, typically 30 to 60 seconds.

EXAMPLE 3

Roller Die Extrusions

In this example about 3.0 liters of 13.7% solids PBT/PPA dope (40 I.V.) was extruded using a roller die substantially as illustrated in FIG. 7. The processing conditions were those listed in Table II. Approximately 1.0 liter of dope was extruded in each of the three trial extrusions.

TABLE II

Processing conditions for roller-die extrusions of 40 I.V. PBT/PPA dope

| Run | Throughput cc/min | Draw | Die Temperature | °F. |
|---|---|---|---|---|
| 1, 2 | 4.8–8.0 | — | 190° | 230° |
| 3 | 12.8 | 4.6:1 | " | 230° |
| | 15.8 | 3.8:1 | " | 230° |

The first two runs gave useful operating information on the roller die system, but did not produce high quality film. The roller die required higher throughputs than the tube die used in the previous examples, and at throughputs around 10 cc/min, the feed vessel could not feed the extruder screw sufficiently. Therefore the feedpot system was modified from the air-driven piston of the previous Examples to a hydraulic-ram-driven one.

The uncoagulted PBT/PPA extrudate could be released from the rollers of the die, with application of a mold release agent "ReleaseaGen H-1501", formerly produced by General Mills.

In run #3, about 15–20 feet of 2 in. wide×0.075 in. thick (washed state) sheet-like PBT was extruded. This thick film had a regular V-shaped, ridged pattern. By visual inspection, the film had a microfibrillar structure in the machine direction. However it was more difficult to split parallel to the machine direction in comparison to a uniaxial film. The film thus has the desired improvement in transverse strength.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A method of preparing biaxially ordered polymer films comprising the sequential steps of:
    (a) treating a dope containing an ordered polymer with simultaneous biaxial shearing forces, thereby producing a film having at least two microscale structural orientations;
    (b) treating the film obtained in step (a) with cross-directional strains comprising transverse and longitudinal extensions, thereby imparting additional microscale structural orientation to the film; and
    (c) solidifying the film obtained to retain the microscale structural orientation imparted thereto.

2. The method of claim 8, wherein said shear forces of step (a) are imparted by counter-rotating die members and longitudinal flow between said die members.

3. The method of claim 1, wherein said physical microscale solidification means comprises treatment of the stressed dope in an aqueous coagulation bath.

4. The method of claim 1, wherein the thermal microscale solidification means comprises drying the tubular film under a positive pressure.

5. The method of claim 1, further comprising tube blowing of the stressed ordered polymer dope, said tube blowing imparting an additional microstructure strain to said dope.

6. The method of claim 1, wherein said chemical microscale solidification means comprises treating the dope with a chemical additive.

7. The method of claim 6, wherein said chemical additive is polyphenylene sulfide.

8. The method of claim 6, wherein said chemical additive is caprolactam.

9. The method of claim 6, wherein said chemical additive is polyamic acid.

10. The method of preparing a biaxially ordered polymer film comprising the sequential steps of:
    (a) pretreating a solution of ordered polymer dope by heating to a temperature within its orientation range and degassing said heated polymer dope;
    (b) extruding a film from said degassed polymer such that simultaneous biaxial shearing forces act upon the polymer, imparting a biaxial microscale structural orientation to the film;
    (c) subjecting the film obtained in step (b) to cross-sectional strains comprising transverse and longitudinal extensions thereby further orientating said film; and
    (d) solidifying the film obtained to retain the microscale structural orientation imparted thereto.

11. The method of claim 1, wherein step (c) comprises the sequential steps of:
    (i) coagulating said oriented film;
    (ii) washing said film; and
    (iii) drying and densifying said film.

12. The method of preparing a biaxially oriented ordered polymer film comprising the sequential steps of:
    (a) extruding an ordered polymer dope such that biaxial shearing forces simultaneously act upon the dope, creating a film and imparting a first biaxial orientation thereto; and
    (b) subsequently stretching said film, thereby imparting a second diaxial orientation thereto;
    (c) solidifying the film obtained to retain the biaxial orientation imparted thereto.

13. A method of preparing an ordered polymer film comprising: conditioning a dope of an ordered polymeric material in a solvent to remove entrapped gas therefrom; extruding the conditioned material through a counter rotating die into a film having at least two microscale structural orientations; subjecting the film to cross-directional strains comprising transverse and longitudinal extensions thereby further orienting said film; coagulating the polymeric material; removing the solvent; and heat treating the resulting film.

14. The method of claim 13, wherein the polymeric material in the film is coagulated by quenching in an aqueous coagulation bath.

15. The method of claim 14, wherein the solvent is removed by washing the film with water, and further comprising drying the washed film.

16. The method of claim 13 or 14 wherein the shear stress applied to the film during manufacture is sufficient to produce film having an ultimate tensile stress in any direction of at least 40,000 psi.

17. The method of claim 16 wherein the shear stress applied to the film during manufacture is sufficient to produce film having an ultimate tensile stress of at least 100,000 psi in at least one direction.

18. The method of claim 13 or 14 wherein the shear stress applied to the film during manufacture is sufficient to produce film having a tensile modulus in any direction of at least $8 \times 10^5$ psi.

19. The method of claim 15 wherein the shear stress applied to the film during manufacture is sufficient to produce film having a tensile modulus of at least $5 \times 10^6$ psi in at least one direction.

20. The method of claim 13 wherein the solvent is polyphosphoric acid, methanesulfonic acid or chlorosulfonic acid.

21. The method of claim 13 wherein the ordered polymer a para-ordered, aromatic heterocyclic polymer, an ordered, linear, crystalline polymer containing aliphatic, cycloaliphatic and araliphatic moieties, a para-ordered aromatic heterocyclic polymer having diphenoxybenzene swivel sections in the polymer chain, a para-ordered aromatic heterocyclic polymer containing phenyl groups along the polymer chain backbone, or p-phenylenebenzo bisthiazole.

22. The method of claim 13 wherein the ordered polymer is p-phenylenebenzo bisthiazole and the solvent is poly phosphoric acid.

23. The method of claim 1, wherein the transverse extension is provided by blowing the film and the longitudinal extension is provided by drawing the film.

24. The method of claim 23, wherein the blow ratio is from about 1:1 to about 3:1.

25. The method of claim 23, wherein the draw ratio is from about 8:1 to about 20:1.

26. The method of claim 2, wherein the counter-rotating members are assembled to provide an assembly having a ratio of shear zone axial length to annular gap of greater than about 50:1.

27. The method of claim 12, wherein stretching said film comprises blowing and drawing the film.

28. The method of claim 27, wherein the blowing and drawing is carried out simultaneously.

29. The method of claim 27, wherein the blow ratio is from about 1:1 to about 3:1.

30. The method of claim 27, wherein the draw ratio is from about 8:1 to about 20:1.

31. The method of claim 12, wherein the counter-rotating dies have a ratio of shear zone axial length to annular gap of greater than about 50:1.

* * * * *